US008477618B2

(12) United States Patent
Martin

(10) Patent No.: US 8,477,618 B2
(45) Date of Patent: Jul. 2, 2013

(54) METHODS AND APPARATUS FOR USE IN COMMUNICATING DATA PACKETS WITHIN A DATA PACKET WINDOW HAVING A SIZE THAT IS SET BASED ON QUALITY OF SERVICE (QOS) PARAMETERS

(75) Inventor: Daryl Joseph Martin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 356 days.

(21) Appl. No.: 12/837,662

(22) Filed: Jul. 16, 2010

(65) Prior Publication Data

US 2012/0014252 A1 Jan. 19, 2012

(51) Int. Cl.
*G01R 31/08* (2006.01)

(52) U.S. Cl.
USPC .......................................................... 370/235

(58) Field of Classification Search
USPC .......... 370/229, 232–234, 235–238; 709/223, 709/231
See application file for complete search history.

(56) References Cited

U.S. PATENT DOCUMENTS

| | | | |
|---|---|---|---|
| 5,533,094 A | 7/1996 | Sanmugam | |
| 6,091,960 A | 7/2000 | Raith et al. | |
| 6,094,426 A | 7/2000 | Honkasalo et al. | |
| 6,385,673 B1 | 5/2002 | Demoney | |
| 6,665,307 B1 | 12/2003 | Rydnell et al. | |
| 6,680,930 B2 | 1/2004 | Newberg et al. | |
| 6,707,869 B1 | 3/2004 | Zhang | |
| 6,901,081 B1 | 5/2005 | Ludwig | |
| 7,154,868 B1 | 12/2006 | Sharma et al. | |
| 7,643,418 B1 * | 1/2010 | Varier et al. | 370/232 |
| 2003/0035420 A1 | 2/2003 | Niu | |
| 2003/0154272 A1 * | 8/2003 | Dillon et al. | 709/223 |
| 2004/0141503 A1 | 7/2004 | Sinha | |
| 2005/0036511 A1 | 2/2005 | Baratakke et al. | |
| 2007/0025301 A1 | 2/2007 | Petersson et al. | |
| 2007/0076626 A1 | 4/2007 | Wise et al. | |
| 2011/0010461 A1 * | 1/2011 | Lassila et al. | 709/231 |

FOREIGN PATENT DOCUMENTS

| | | |
|---|---|---|
| DE | 19707261 C1 | 4/1998 |
| EP | 1613002 A1 | 1/2006 |
| EP | 2028798 A1 | 2/2009 |
| WO | 03043258 A1 | 5/2003 |
| WO | 2005002148 A1 | 1/2005 |
| WO | 2005057800 A2 | 6/2005 |
| WO | 2006117644 A1 | 11/2006 |

OTHER PUBLICATIONS

Examination Report, EP patent application # 10169811.6, Oct. 27, 2011.
European Search Report & Written Opinion for EP Application #10169811.6, Dec. 6, 2010.

* cited by examiner

Primary Examiner — Ricky Ngo
Assistant Examiner — Iqbal Zaidi
(74) Attorney, Agent, or Firm — John J. Oskorep, Esq.

(57) ABSTRACT

Methods and apparatus for use in communicating data packets to communication devices are described. A communication device receives one or more Quality of Service (QoS) parameters of a data communication session established between it and a wireless communication network. The one or more QoS parameters may be or include a bandwidth parameter. The communication device sends the bandwidth parameter or a value derived therefrom to a host system via the wireless communication network. The communication device then receives, from the host system via the wireless communication network, data packets via the data communication session. The data packets are communicated within a data packet window having a size that is set as a function of the bandwidth parameter. If another data communication session is established, the communication device sends an updated bandwidth parameter to the host system for receiving data packets within a data packet window having an updated size that is set in accordance with the function.

33 Claims, 10 Drawing Sheets

FIG. 1
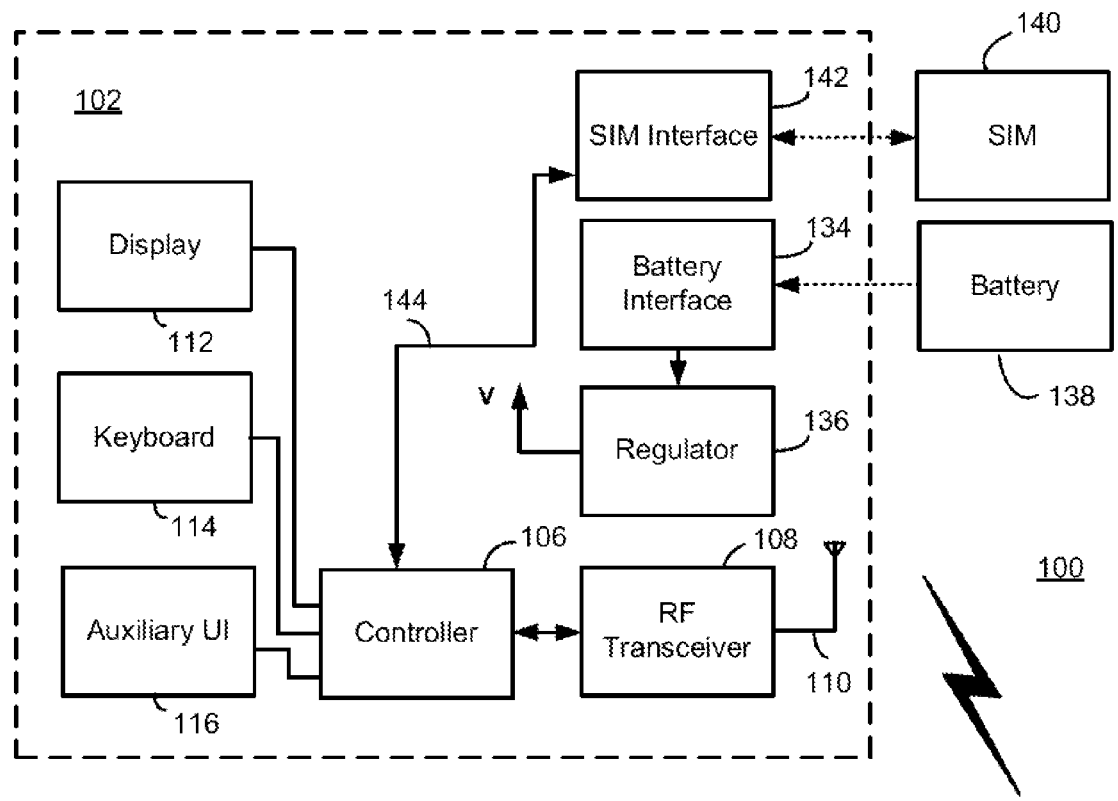
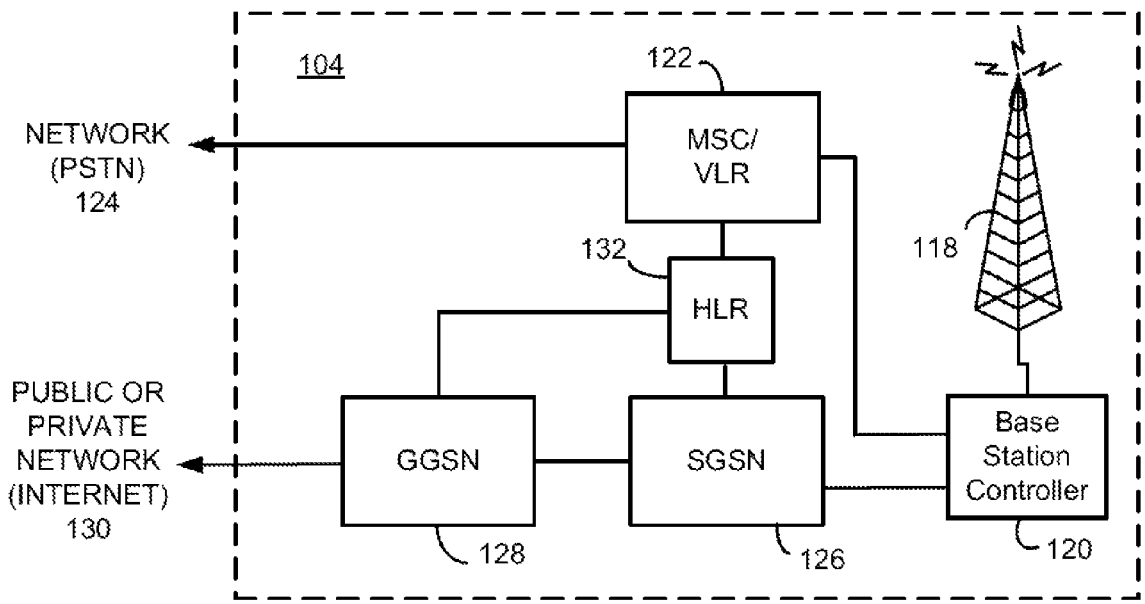

METHODS AND APPARATUS FOR USE IN COMMUNICATING DATA PACKETS WITHIN A DATA PACKET WINDOW HAVING A SIZE THAT IS SET BASED ON QUALITY OF SERVICE (QOS) PARAMETERS

BACKGROUND

1. Field of the Technology

The present disclosure generally relates to the communication of data packets to communication devices operating in wireless communication networks.

2. Description of the Related Art

A communication device (e.g. a mobile communication device, such as a mobile station or MS) may operate in a wireless communication network which provides packet data communications for the device. The mobile device may offer a number of different capabilities or features for a user. Many of these capabilities are defined by the different applications which are installed in the mobile device. The mobile device may have a voice telephony application, a data or message synchronization application (e.g. for e-mail messages or calendar items), a Web browser application, as examples. These applications operate in connection with different communication services provided in the wireless network.

When an application is initially invoked, the mobile device causes the associated communication service to be activated in the wireless network. In particular, a packet data session needs to be established for each application or service. For wireless networks which employ a General Packet Radio Service (GPRS), the packet data session may be a Packet Data Protocol (PDP) context. Here, a specific Application Point Name (APN) is utilized to determine how the mobile device communicates via the wireless network to a host site.

A host server communicates data to the mobile device in data packets via the packet data session. However, inefficiencies may result in data throughput or network/server queuing if care is not taken in how and at what rate the data packets are communicated to the mobile device.

What are needed are methods and apparatus to overcome these and related deficiencies of the prior art. The same or similar problems may exist in other networks and devices.

BRIEF DESCRIPTION OF THE DRAWINGS

Embodiments of present disclosure will now be described by way of example with reference to attached figures, wherein:

FIG. 1 is a block diagram which illustrates pertinent components of a communication system which includes a mobile communication device and a wireless communication network;

DETAILED DESCRIPTION OF THE PREFERRED EMBODIMENTS

Figure 2:
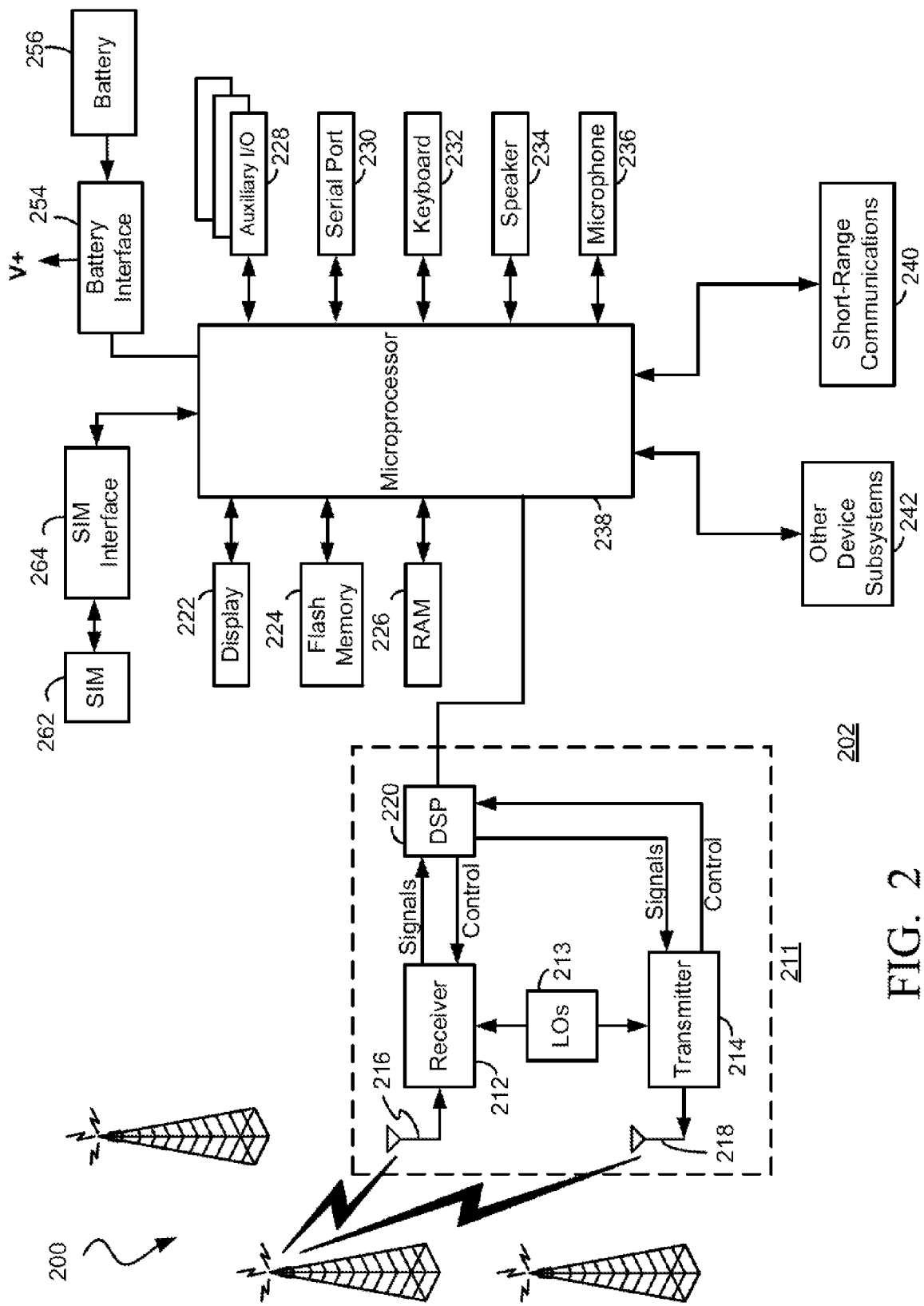
FIG. 2 is a more detailed diagram of a preferred mobile communication device of FIG. 1, namely a mobile station.

Methods and apparatus for use in communicating data packets are described herein. A communication device of the present disclosure receives one or more Quality of Service (QoS) parameters of a data communication session established between it and a wireless communication network. The one or more QoS parameters may be or include a bandwidth parameter. The communication device sends the bandwidth parameter or a value derived therefrom to a host system via the wireless communication network. The communication device then receives, from the host system via the wireless communication network, data packets via the data communication session. The data packets are communicated within a data packet window having a size that is set as a function of the bandwidth parameter. If another data communication session is established, the communication device sends an updated bandwidth parameter to the host system for receiving data packets within a data packet window having an updated size that is set in accordance with the function.

Correspondingly, a host system which may be or include a host server receives a bandwidth parameter or a value derived therefrom from a mobile communication device operative in a wireless communication network. The bandwidth parameter is identified from one or more Quality of Service (QoS) parameters of a data communication session established between the mobile communication device and the wireless communication network. The host system selects a size of a data packet window as a function of the bandwidth parameter or the value derived therefrom. The host system then communicates, to the mobile communication device via the wireless communication network, data packets within a data packet window having the selected size. If another data communication session is established, the host system receives an updated bandwidth parameter from the mobile communication device for determining or selecting an updated size in accordance with the function for communicating data packets within a data packet window having the updated size.

As described herein, the techniques of the present disclosure utilize a "data packet window" for packet data communications. The data packet window may be or be referred to as an "in-flight" data packet window. The size of an "in-flight" data packet window specifies the maximum number of data packets that are permitted to be communicated from the sender (e.g. the host server or system) to the recipient (e.g. communication device) without the receipt of corresponding acknowledgements before the sender is permitted to send any additional data packets to the recipient. For example, using the in-flight data packet window approach, as long as any one of data packets 1, 2, or 3 being communicated is acknowledged, the sender is permitted to send another data packet to the match the number of data packets "in-flight".

Such an in-flight data packet window is particularly suitable in a wireless environment for particular data applications. For example, several different small independent messages may be communicated at or around the same time, and the mobile device may be able to receive (and to display, for example) a second message before it receives a first message. The small independent messages may be or include, for example, small incremental changes in data for data-synchronized communication with network applications, e-mail messages/data, calendar appointment message/data, etc. By using an in-flight data packet window, an efficient use of the communication channel is utilized for the particular data applications of the mobile device, as subsequent message communications are not halted when leading messages are being resent.

In the techniques of the present disclosure, the size of such data packet window is set as a function of a bandwidth parameter from the mobile device. The bandwidth parameter is received at the mobile device as one or more Quality of Service (QoS) parameters of a data communication session established between the communication device and a wireless communication network. The data communication session may be or include a packet data session, which may utilize a Packet Data Protocol "PDP" context. The function utilized to set the size of the data packet window may be a positive step function. The size may be an initial size of the data packet window, where this initial size is subsequently adjusted based on a round trip time of the data packets being communicated, and/or other criteria.

In contrast to an "in-flight" data packet window, a "sliding" data packet window approach may be alternatively useful where alternatively a stream of data is being communicated, and a first byte needs to be received before a second byte is useful (e.g. a streaming video). The sliding data packet window approach may also be useful where a very large file is being communicated and the receiver does not have sufficient memory available to buffer all of the data (e.g. downloading a new program). With a sliding data packet window approach, if the permitted window size is three (3), the sender is allowed to send data packets 1, 2, and 3. If data packet 1 is acknowledged, the sender is permitted to send data packet 4. However, if data packet 2 is acknowledged before data packet 1, the sender is not permitted to send any other following data packet until data packet 1 is acknowledged.

To illustrate an exemplary environment for practicing the techniques of the present disclosure, FIG. 1 is a block diagram of a communication system 100 which includes a mobile communication device 102 which communicates in a wireless communication network 104. Mobile device 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation in of mobile device 102, whereas signal processing operations associated with communication functions are typically performed in RF transceiver circuitry 108. Controller 106 interfaces with device display 112 to display, received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a tower station 118 and a base station controller (BSC) 120 (described later below), including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile device 102 is intended to operate. When mobile device 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 includes a battery interface 134 for receiving one or more rechargeable batteries 138. Battery 138 electrical power to electrical circuitry in mobile device 102, and battery interface 134 provides for a mechanical and electrical connection for battery 138. Battery interface 134 is coupled to a regulator 136 which regulates power to the device. Mobile device 102 may be a handheld portable communication device, which includes a housing (e.g. a plastic housing) which carries and contains the electrical components of mobile device 102 including battery 138. Mobile device 102 operates using a Subscriber Identity Module (SIM) 140 which is connected to or inserted in mobile device 102 at a SIM interface 142. SIM 140 is one type of a conventional "smart card" used to identify an end user (or subscriber) of mobile device 102 and to personalize the device, among other things. By inserting SIM 140 into mobile device 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile device. SIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Preferably, as mentioned earlier, mobile device 102 is a handheld portable communication device which includes a housing (e.g. a plastic housing) which carries and contains the electrical components of mobile device 102. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Today, such a mobile device may further operate in accordance with Enhanced Data rates for GSM Evolution (EDGE) or Enhanced GPRS (EGPRS), as described in the Background section. In such environment, wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile devices within its cell via station 118. The transceiver equipment normally performs such functions as modulation and possibly encoding and/or encryption of signals to be transmitted to the mobile device in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile device's 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on algorithms, keys, and criteria (e.g. as in existing GSM). In conventional operation, cell selection may be performed autonomously by mobile device 102 or by the transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming GPRS data, or SMS messages over GPRS. In order to send and receive GPRS data, mobile device 102 assists in activating the packet data address that it wants to use. This operation makes mobile device 102 known to GGSN 128; interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128.

FIG. 2 is a detailed block diagram of a preferred mobile device 202 of the present disclosure which may be referred to as a mobile station. Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of fixed transceiver stations 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 may utilize a Subscriber Identity Module or "SIM" card 262 to be inserted in a SIM interface 264 in order to operate in the network. SIM 262 includes those features described in relation to FIG. 1. Mobile device 202 is a battery-powered device so it also includes a battery interface 254 for receiving one or more rechargeable batteries 256. Such a battery 256 provides electrical power to most if not all electrical circuitry in mobile device 202, and battery interface 254 provides for a mechanical and electrical connection for it. The battery interface 254 is coupled to a regulator (not shown) which provides a regulated voltage V to all of the circuitry.

Mobile device 202 includes a microprocessor 238 (which is one implementation of controller 106 of FIG. 1) which controls overall operation of mobile device 202. Communication functions, including at least data and voice communications, are performed through communication subsystem 211. The communication techniques of the present disclosure may generally be controlled by microprocessor 238 in connection with DSP 220. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information. The PIM application preferably has the ability to send and receive data items via the wireless network. In the present disclosure, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. These applications will be described later in relation to FIG. 5 below.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211. For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication. Short-range communications subsystem 240 of FIG. 2 is an additional optional component which provides for communication between mobile device 202 and different systems or devices, which need not necessarily be similar devices.

Figure 3:
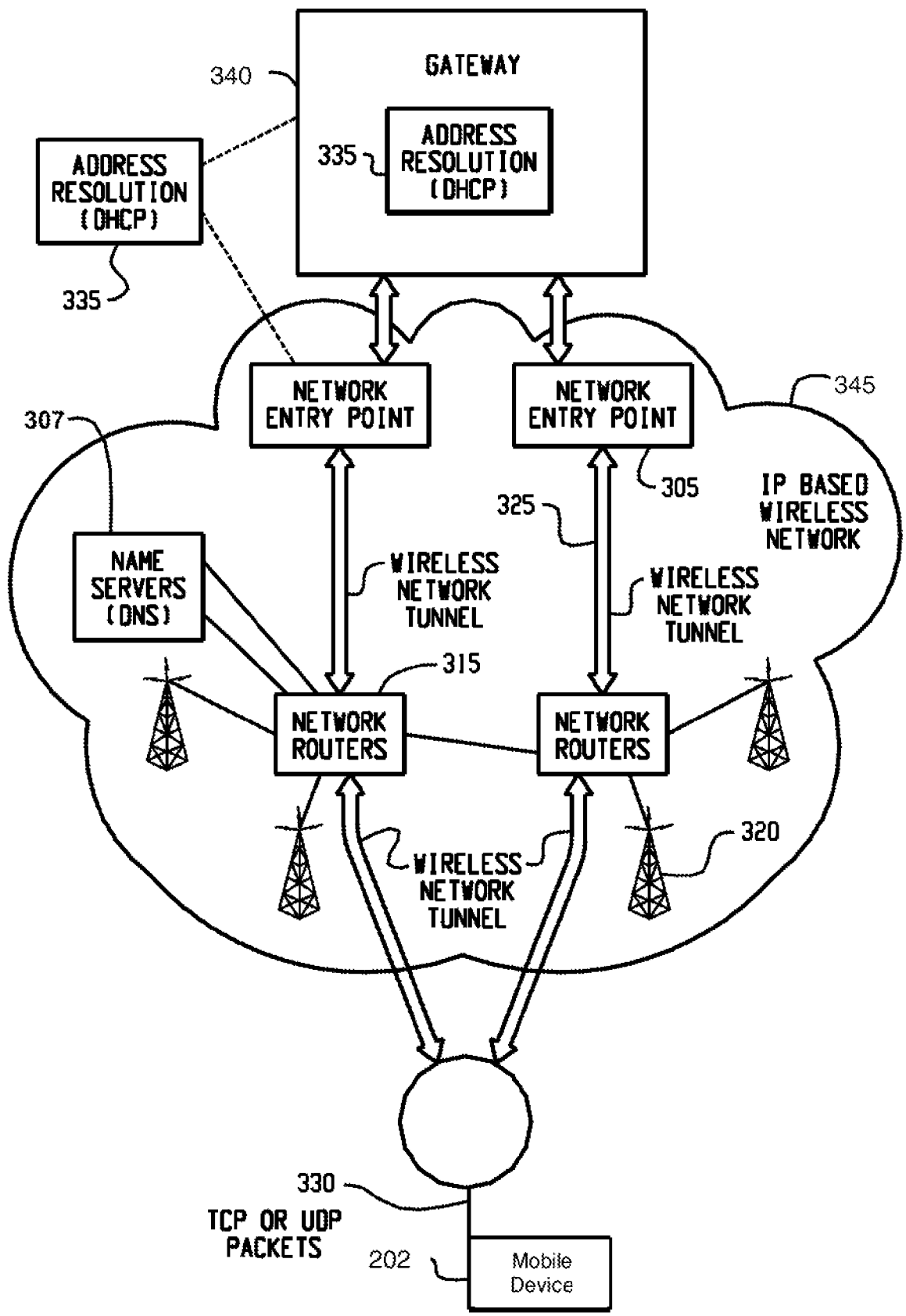
FIG. 3 is a particular system architecture for the mobile device and wireless network of FIGS. 1 and 2 for packet data communications.

FIG. 3 shows a particular system structure for packet data communications with mobile device 202. Mobile device 202 is shown to communicate in a wireless packet data network 345. As shown in FIG. 3, a gateway 340 may be coupled to an internal or external address resolution component 335 and one or more network entry points 305. Data packets are transmitted from gateway 340, which is source of information to be transmitted to mobile device 202, through network 345 by setting up a wireless network tunnel 325 from gateway 340 to mobile device 202. In order to create this wireless tunnel 325, a unique network address is associated with mobile device 202. In an IP-based wireless network, network addresses are typically not permanently assigned to a particular mobile device 202 but instead are dynamically allocated on an as-needed basis. It is thus preferable for mobile device 202 to acquire a network address and for gateway 340 to determine this address so as to establish wireless tunnel 325.

Network entry point 305 is generally used to multiplex and demultiplex amongst many gateways, corporate servers, and bulk connections such as the Internet, for example. There are normally very few of these network entry points 305, since they are also intended to centralize externally available wireless network services. Network entry points 305 often use some form of address resolution component 335 that assists in address assignment and lookup between gateways and mobile devices. In the embodiment described, address resolution component 335 is shown as a dynamic host configuration protocol (DHCP) as one method for providing an address resolution mechanism.

A central internal component of wireless data network 345 is a network router 315. Normally, network routers 315 are proprietary to the particular network, but they could alternatively be constructed from standard, commercially available hardware. The purpose of network routers 315 is to centralize thousands of fixed transceiver stations 320 normally implemented in a relatively large network into a central location for a long-haul connection back to network entry point 305. In some networks there may be multiple tiers of network routers 315 and cases where there are master and slave network routers 315, but in all such cases the functions are similar. Often network router 315 will access a name server 307, in this case shown as a dynamic name server (DNS) 307 as used in the Internet, to look up destinations for routing data messages. Fixed transceiver stations 320, as described above, provide wireless links to mobile device 202.

Wireless network tunnels such as a wireless tunnel 325 are opened across wireless network 345 in order to allocate necessary memory, routing, and address resources to deliver IP packets. Such tunnels 325 are activated as part of what are referred to as Packet Data Protocol or "PDP contexts" (i.e. packet data sessions).

To open wireless tunnel 325, mobile device 202 must use a specific technique associated with wireless network 345. The step of opening such a wireless tunnel 325 may require mobile device 202 to indicate the domain, or network entry point 305 with which it wishes to open wireless tunnel 325. In the embodiment described, the tunnel first reaches network router 315 which uses name server 307 to determine which network entry point 305 matches the domain provided. Multiple wireless tunnels can be opened from one mobile device 202 for redundancy, or to access different gateways and services on the network. Once the domain name is found, the tunnel is then extended to network entry point 305, and necessary resources are allocated at each of the nodes along the way. Network entry point 305 then uses the address resolution component 335 (e.g. DHCP) to allocate an IP address for mobile device 202. When an IP address has been allocated to mobile device 202 and communicated to gateway 340, information can then be forwarded from gateway 340 to mobile device 202.

Figure 4:
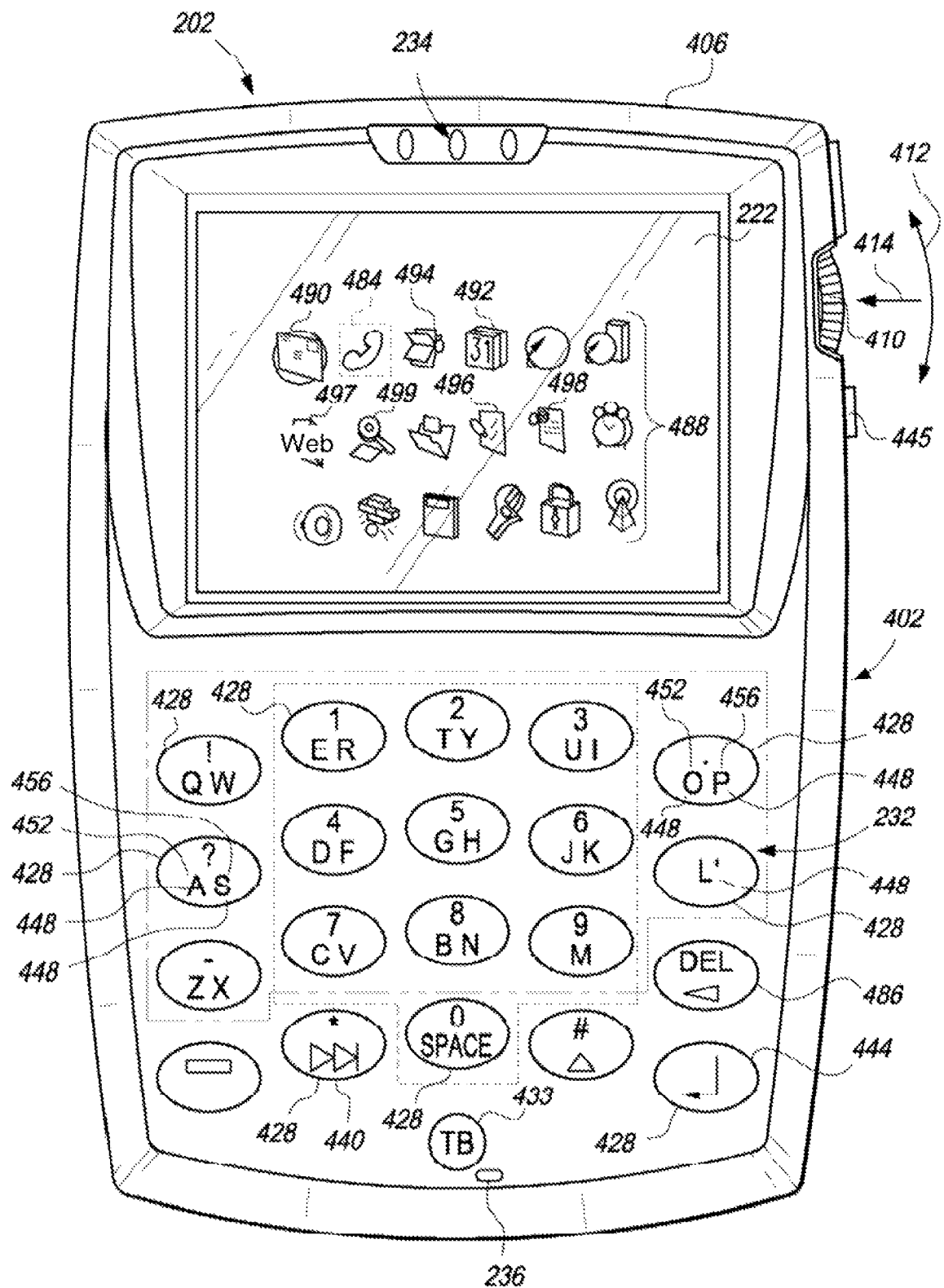
FIG. 4 is an illustrative example of an exemplary user interface of the mobile device of FIGS. 1 and 2.

Referring now to FIG. 4, what is shown is an illustrative representation of an exemplary user interface 402 of mobile device 202 of FIGS. 1-3 which includes at least display 222, keyboard 232, speaker 234, microphone 236, and a cursor or view positioning mechanism such as a positioning wheel 410 (e.g. a scrollwheel) or a trackball 433. Although shown enlarged in FIG. 4 for clarity, this mobile device 202 is sized to be a handheld portable device. As an alternative to or in addition to positioning wheel 410 and/or trackball 433, a wide range of one or more pointing or cursor/view positioning mechanisms such as a touch pad a joystick button, a mouse, a touchscreen, a tablet, or other whether presently known or unknown, may be employed. The cursor may be or include a pointer, a movable item or other visual cue used to mark a position or point to another item on a display, in order to, for example, indicate position for data entry or for selection of the other item.

Keys 428 of keyboard 232 are disposed on a front face of a housing 406 and positioning wheel 410 is disposed at a side of housing 406. Keyboard 232 is in the example form of a reduced QWERTY keyboard including a plurality of keys 428 that serve as input members. It can be seen that the arrangement of the characters 448 on keys 428 of keyboard 424 is generally of the QWERTY arrangement, albeit with many of keys 428 including two of characters 448. In the example depiction of keyboard 424, many of keys 428 include two characters, such as including a first character 452 and a second character 456 assigned thereto. Characters may include letters, digits, symbols and the like and can additionally include ideographic characters, components thereof, and the like. One of keys 428 of keyboard 424 includes as the characters 448 thereof the letters "Q" and "W", and an adjacent key 428 includes as the characters 448 thereof the letters "E" and "R". Keyboard 424 may be of other configurations, such as an AZERTY keyboard, a QWERTZ keyboard, a Dvorak keyboard, or other keyboard or keypad arrangement, and either reduced or not reduced (i.e. full). In a "full" or non-reduced keyboard or keypad arrangement, each key has a single letter (not multiple letters) of the alphabet assigned to it.

Among keys 428 of keyboard 232 are a <NEXT> key 440 and an <ENTER> key 444. The <NEXT> key 440, wherein, for example, "<NEXT>" may be a symbol or may be the word "next" provided (e.g. printed) on the key, may be pressed to provide a selection input to the processor and provides substantially the same selection input as is provided by a rotational input of positioning wheel 410. Since <NEXT> key 440 is provided adjacent a number of other keys 428 of keyboard 232, the user can provide a selection input to the processor substantially without moving the user's hands away from the keyboard 232 during a text entry operation. Another key, the <ESC> key 445 is disposed on the side of housing 406 adjacent positioning wheel 438, although the same or similar key may be disposed as part of keyboard 232. Among keys 428 of the keyboard 424 additionally is a <DEL> key 486 that can be provided to delete a text entry.

Positioning wheel 410 may serve as another input member and is both rotatable, as is indicated by an arrow 412, to provide selection inputs to the processor, and also can be pressed in a direction generally toward housing 406, as is indicated by an arrow 414 to provide another selection input to the processor.

Display 222 may include a cursor 484 that depicts generally where the next input or selection from user interface 402 will be received. Display 222 is shown in FIG. 4 as displaying a home screen that represents a number of applications 586 (FIG. 3 shows some of the example possible applications 86)

depicted as corresponding discrete icons 488. Icons 488 include, for example, an Electronic Mail (E-Mail) icon 490, a Calendar icon 492, an Address Book icon 494, a Tasks icon 496, a Messages icon 497, a MemoPad icon 498, and a Search icon 499, respectively.

Figure 5:
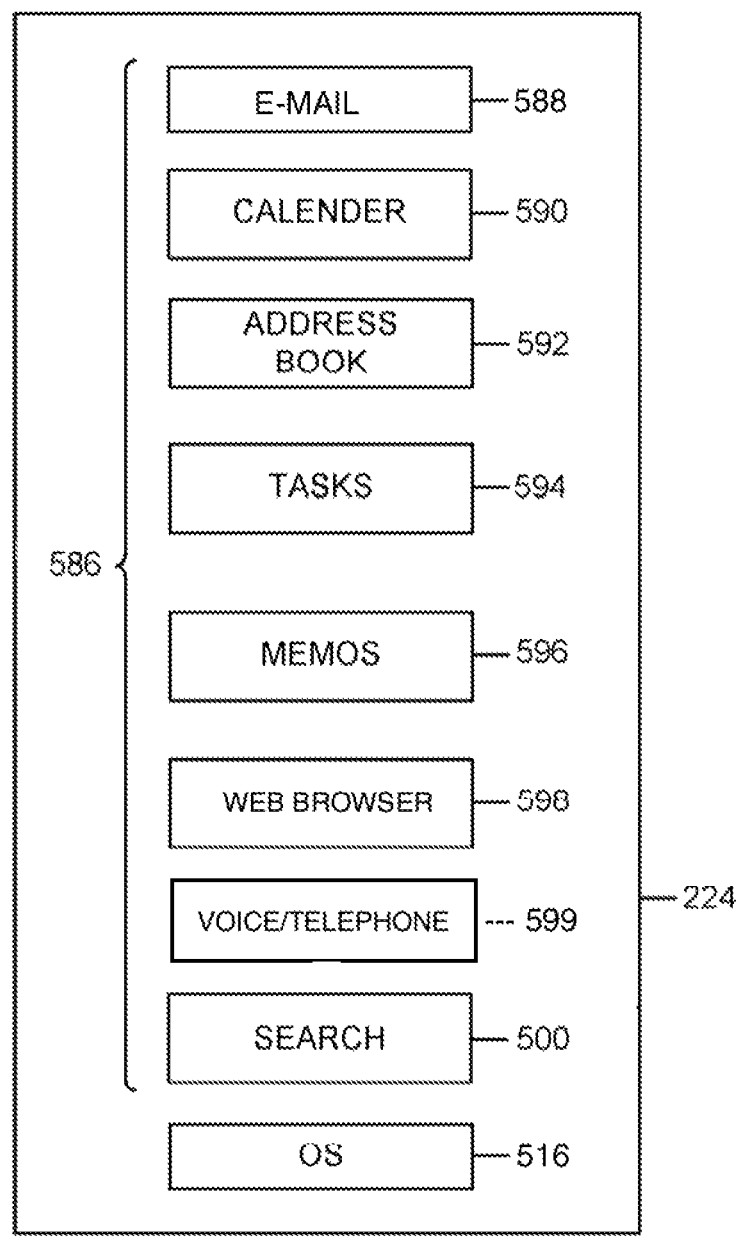
FIG. 5 is an illustrative representation of memory of the mobile device which has a plurality of applications stored therein.

As shown further in FIG. 5, memory 224 of mobile device 202 includes a plurality of applications or routines 586 associated with the visually displayed icons 488 of FIG. 4 for the processing of data. Applications 586 may be in any of a variety of forms such as, without limitation, software, firmware, and the like. Applications 586 include, for example, an Electronic Mail (E-Mail) application 588 (FIG. 5) associated with E-mail icon 490 (FIG. 4), a Calendar application 590 (FIG. 5) associated with Calendar icon 492 (FIG. 4), an Address Book application 592 (FIG. 5) associated with Address Book icon 494 (FIG. 4), a Tasks application 594 (FIG. 5) associated with Tasks icon 496 (FIG. 4), a MemoPad (Memos) application 596 (FIG. 5) associated with MemoPad icon 498, a Web Browser application 598 (FIG. 5) associated with Web Browser icon 497 (FIG. 4), a Voice/Telephone application 599 (FIG. 5) associated with Voice/Telephone icon 484, and a Search application 500 (FIG. 5) associated with Search icon 499 (FIG. 4). An operating system (OS) program 516 also resides in memory 224.

In FIG. 4, the "home" screen output is shown as currently active and constitutes the main "ribbon" application for displaying the icons 488 shown. An application, such as E-mail application 588 of FIG. 5, may then be initiated (opened or viewed) from user interface 402 by providing a suitable user input to it. For example, E-mail application 588 may be initiated (opened or viewed) by rotating positioning wheel 410 to highlight E-mail icon 490 and providing a selection input by translating positioning wheel 410 in the direction indicated by arrow 438. As another example, display 222 displays icon 499 associated with Search application 500 and accepts input from positioning wheel 410 to initiate a search from that icon 499. Applications 586 may be additionally or alternatively initiated (opened or viewed) from user interface 402 by providing another suitable input to it, such as by suitably rotating or "rolling" trackball 433 and providing a selection input by, for example, pushing the trackball 433 (e.g. somewhat similar to positioning wheel 410 except into the plane of FIG. 4).

Movement, navigation, and/or scrolling with use of a cursor/view positioning mechanism is beneficial given the relatively large size of visually displayed information and the compact size of display 222 of FIG. 4, and since information and messages are typically only partially presented in the limited view of display 222 at any given moment. As previously described, positioning wheel 410 is one helpful cursor/view positioning mechanism to achieve such movement. Positioning wheel 410, which may be referred to as a scrollwheel, specifically includes a circular disc which is rotatable about a fixed axis of housing 302 and may be rotated by the end user's index finger or thumb. When the information or message is being partially displayed, an upwards rotation of positioning wheel 410 causes an upwards scrolling such that display 222 presents viewing of an upper portion of the information or message. Similarly, a downwards rotation of positioning wheel 410 causes a downwards scrolling such that display 222 presents viewing of a lower portion of the information or message. Positioning wheel 410 is mounted along a fixed linear axis such that the end user can depress positioning wheel 410 inwards toward housing 406 (e.g. with the end user's index finger or thumb) for selection of information. Again, see the direction indicated by an arrow 414 of positioning wheel 410 shown.

Although a specific mobile device 202 has just been described, any suitable mobile communication device or terminal may be part of the methods and apparatus which will be described in fuller detail below. Note that many components of mobile device 202 shown and described may not be included (e.g. a full QWERTY keypad may be optional).

Figure 6:
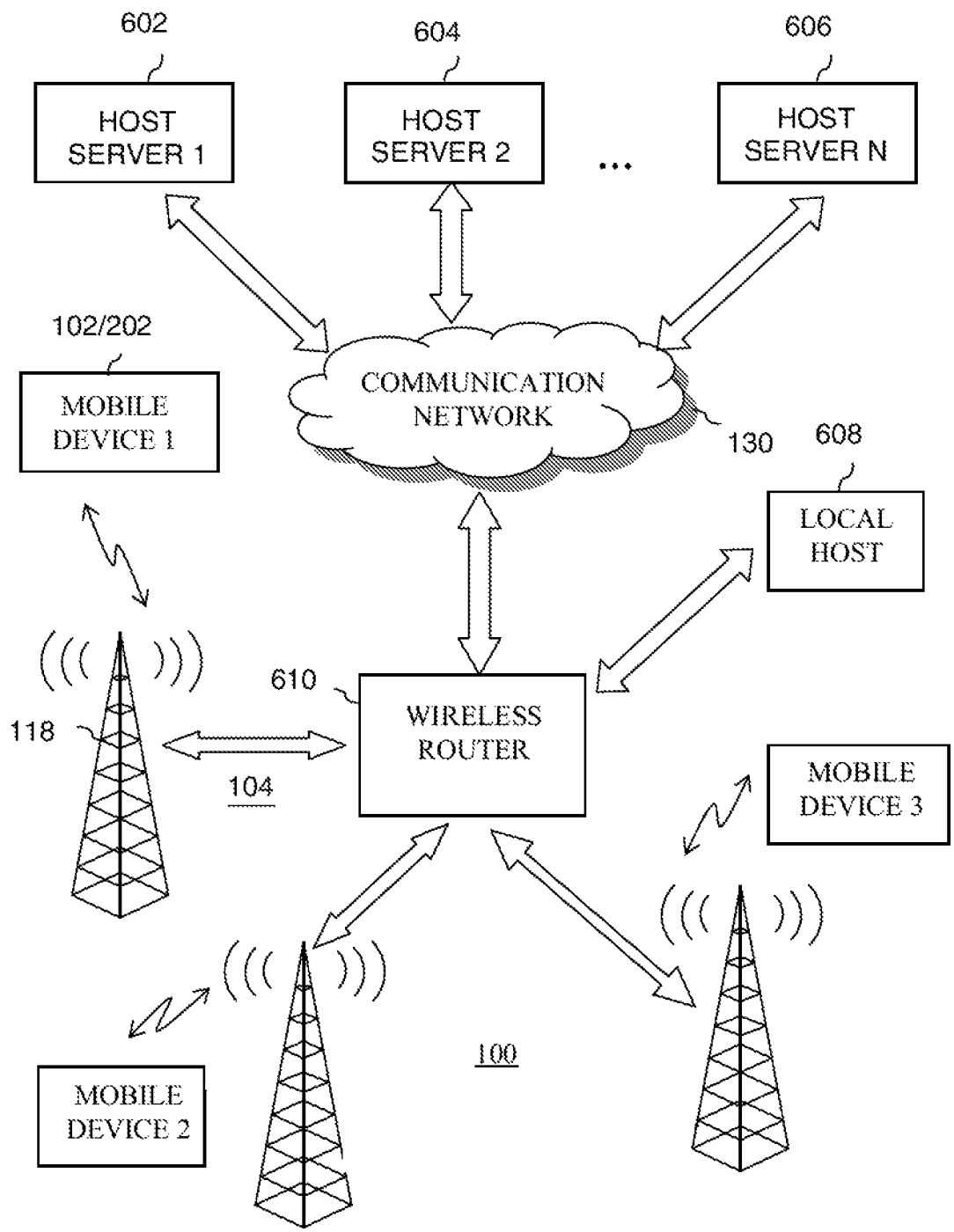
FIG. 6 is a higher-level view of some of the same as well as different network entities involved in communication system 100 of FIG. 1.

FIG. 6 is a higher-level view of some of the same and different network entities involved in communication system 100 described earlier in relation to FIGS. 1 and 3. Communication system 100 includes a plurality of host servers or servers (three of which are shown, namely, host servers 602, 604, and 606). Each host server 602, 604, and 606 may provide one or more services or applications such as, but not limited to, e-mail, calendar, Internet web browser, and other applications, available to subscribers. Each host server 602, 604, and 606 may be part of a (different) private communication network (e.g. of an enterprise or corporation) which includes a firewall. A host server as described herein may be or be part of a host system or network, which may be a distributed system or network having multiple points with which the mobile device communicates.

Host servers 602, 604, and 606 are connected to communication network 130 (e.g. such as Internet) which connects to a wireless router system 610, allowing communication between host servers 602, 604, and 606 and wireless router system 610. Wireless router system 610 may also be connected to a host server, such as a local server 608, without the intermediary communication network 130. Wireless router system 610 may be also connected to a plurality of different wireless networks (which include wireless network 104 having base station 118), each of which may support a plurality of different mobile devices. The wireless networks may be cellular telephone networks, a two-way paging networks, short range wireless networks such as Bluetooth™ and IEEE 802.11 compliant networks, and others alike, where the mobile devices are compatible with the corresponding wireless network.

Wireless router system 610 may be or include one or more servers which facilitate the communication of data as described. In one embodiment, wireless router system 610 may alternatively be a proxy server which facilitates the communication of data between host server and mobile devices.

Host servers 602, 604, and 606 communicate data to the mobile devices in data packets via packet data sessions established between the mobile devices and their corresponding wireless networks. For example, host server 602 may communicate data to mobile device 202 in data packets via wireless router system 610. Wireless router system 610 is configured to properly route the data packets to the mobile devices, and to properly queue in its memory the data packets prior to transmission depending at the rate at which the host servers send the data to wireless router system 610. As apparent, inefficiencies may result in data throughput or network/server queuing in wireless router system 610 if care is not taken in how and at what rate the data packets are communicated to the mobile device.

Figure 7:
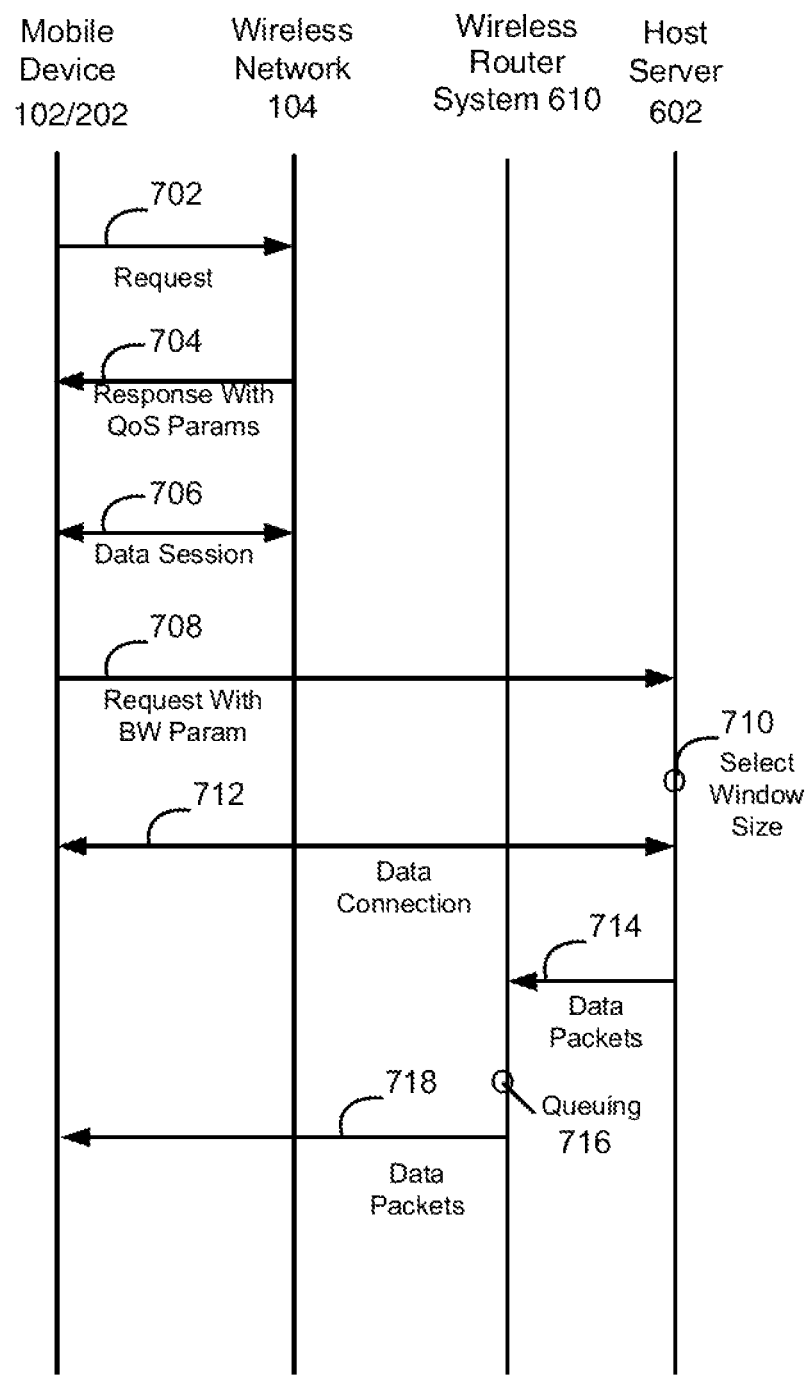
FIG. 7 is a process flow diagram of a method for use in communicating data packets to communication devices, such as the mobile device of FIGS. 1-5.

FIG. 7 is a process flow diagram of a method for use in communicating data packets to communication devices. Such technique may overcome prior art deficiencies and other related deficiencies in the described environments as well as other environments. The method of FIG. 7 may be performed by mobile device 102/202 described in relation to FIGS. 1-6, and/or the host server 602 of FIG. 6, in the environment described in relation to FIGS. 1, 3, and 6. In particular, the techniques described in relation to the diagram may be performed by one or more processors of mobile device 202 along with its wireless transceiver, or by one or more processors of host server 602. A computer program product which may embody the technique may include a computer readable medium (e.g. a memory such as FLASH memory, computer disk, hard disk, etc.) having computer instructions stored therein which are executable by the one or more processors of the mobile device 202, and/or one or more processors of the host server 602, for performing the techniques.

Initially in FIG. 7, an event occurs and is detected at mobile device 202. This event may be a power-on of mobile device 202, an invocation of an application on mobile device 202 via its user interface, a roaming into a new wireless network, etc. Mobile device 202 intends to obtain service from host server 602 for the invoked application (e.g. e-mail message delivery or synchronization). In response to detecting the event, mobile device 202 sends to wireless network 104 one or more messages indicating a request for establishing a data communication session (step 702 of FIG. 7). This data communication session may be or include a packet data session, such as one utilizing a Packet Data Protocol (PDP) Context. Wireless network 104 receives the one or more messages which includes the request.

In response to receiving the request, wireless network 104 sends to mobile device 202 one or more messages which includes a response for establishing the data communication session (step 704 of FIG. 7). One or more of these messages include Quality of Service (QoS) parameters for the data communication session to be established. One of the QoS parameters is a bandwidth parameter which indicates the maximum bandwidth provided or permitted by wireless network 104 for this particular data communication session. Mobile device 202 receives the one or more messages which includes the response and the QoS parameters. Thus, the data communication session between mobile device 202 and wireless network 104 is established for data packet communications therebetween (step 706 of FIG. 7).

In response to establishing the data communication session, or receipt of the QoS parameters, mobile device 708 sends to host server 602 one or more messages which includes a request (e.g. a request for service for the application, if it is not already established) as well as the bandwidth parameter which was extracted by mobile device 202 from the QoS parameters sent from wireless network 104 (step 708 of FIG. 7). As an alternative to sending bandwidth parameter itself, mobile device 202 may send to host server 602 a value derived from or otherwise indicative of the bandwidth parameter. Host server 602 receives the request as well as the bandwidth parameter. In response, a data connection is established between mobile device 202 and host server 602 for communicating data (step 712 of FIG. 7). The data connection may include a TCP/IP connection and/or other suitable connection(s) for communications.

Upon establishing the service (if not already established), host server 602 selects or otherwise determines a size of the data packet window for packet data communications with mobile device 202 (step 710 of FIG. 7). Host server 602 may select or determine the size of the data packet window as a function of the bandwidth parameter. The size of the data packet window may generally be indicated by a number of data packets (e.g. 4, 5, 6, 7 or 8 data packets). The size of the data packet window specifies the maximum number of data packets that are permitted to be communicated from host server 602 to mobile device 202 without the receipt of corresponding acknowledgements before host server 602 is permitted to communicate any additional data packets to mobile device 202.

In general, as the bandwidth indicated by the bandwidth parameter increases, the size of the data packet window increases. Thus, for a larger indicated bandwidth, host server 602 will increase the size of the data packet window. The function utilized at host server 602 may be, for example, a positive step function. Table 1 below is an illustrative example of how the window size may vary over bandwidth in such manner.

TABLE 1

Table For Selection Of Window Size Based On Bandwidth Parameter, Which Utilizes A Positive Step Function

| Bandwidth Range (MHz) | Window Size (Number Of Data Packets) |
|---|---|
| 10-20 | 3 |
| 20-30 | 4 |
| 30-40 | 5 |
| 40-50 | 6 |
| 50-70 | 7 |
| 70-90 | 8 |

Next in FIG. 7, host server 602 communicates data to mobile device 202 via wireless router system 610 in data packets using the selected size of the data packet window. In particular, the data packets are communicated from host server 602 within the selected size of the data packet window where they reach wireless router system 610 (step 714 of FIG. 7). Wireless router system 610 performs a queuing function in its memory (step 716 of FIG. 7) prior to transmission of all data packets to mobile device 202 (step 718 of FIG. 7). Mobile device 202 receives the data in the data packets via the data communication session in wireless network 104.

Figure 8:
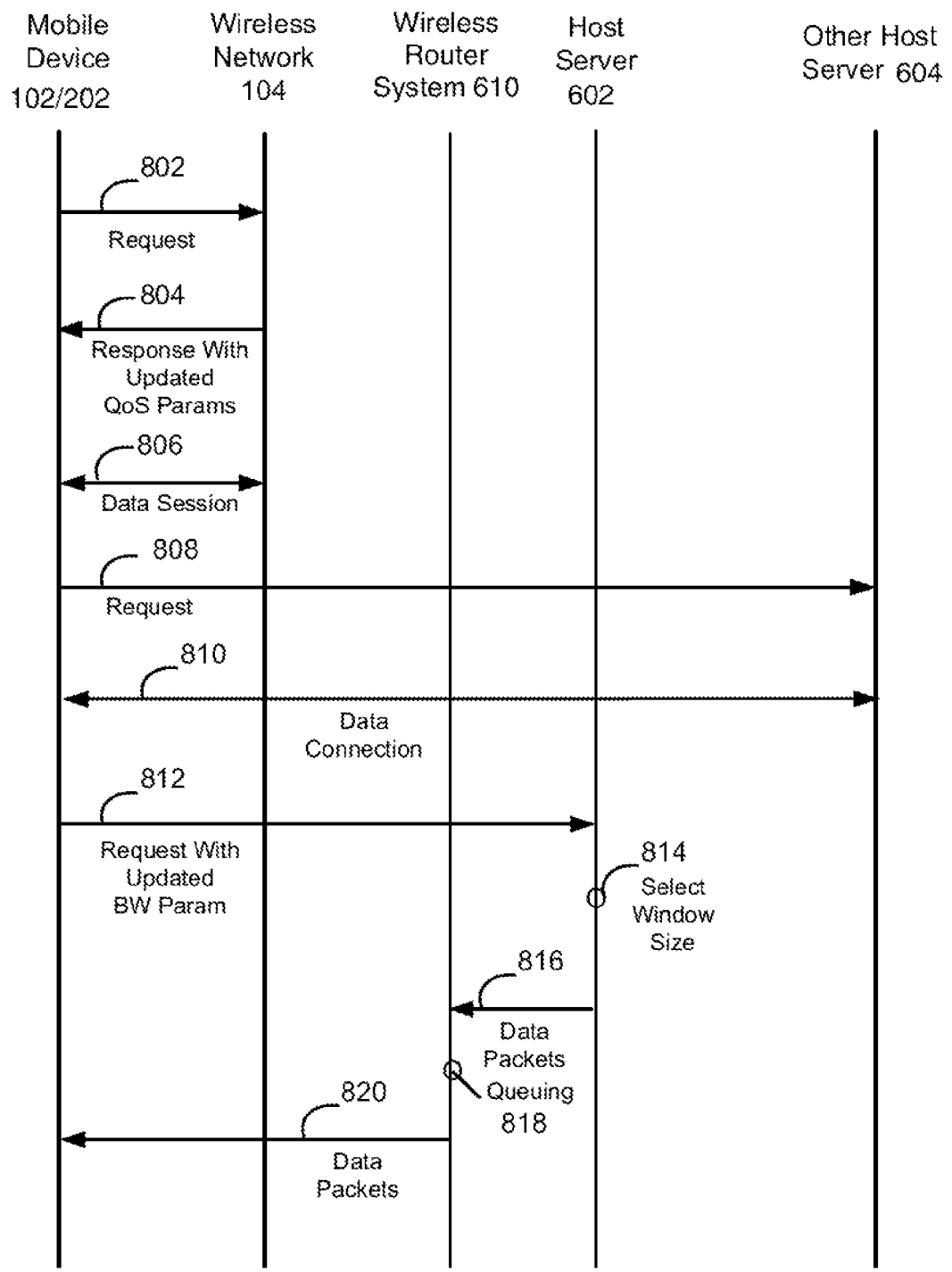
FIG. 8 is an additional process flow diagram which continues the method described in relation to FIG. 7.

FIG. 8 is an additional process flow diagram 800 which continues the method described in relation to FIG. 7. This part of the method illustrates how updates may be made to the QoS parameters through the establishing of new data communication session, or through the termination of an existing data communication session.

The process of FIG. 8 begins with the existence of the data communication session already established between mobile device 202 and wireless network 104 from the method of FIG. 7. The size of the data packet window utilized by host server 602 has already been set. However, another event occurs and is detected at mobile device 202. This event may be an invocation of a new application on mobile device 202 via its user interface, etc. In other embodiments, the event may be an indication to terminate a currently running application.

In response to the invocation of the new application (for example), mobile device 202 intends to obtain service from another host server 604 for the new application (e.g. Web browsing data application or other, etc.). Thus, mobile device 202 sends to wireless network 104 one or more messages indicating a request for establishing a new data communication session (step 802 of FIG. 8). This new data communication session may be or include a new packet data session, such as one utilizing a new Packet Data Protocol (PDP) Context. Wireless network 104 receives the one or more messages which include the request.

In response to receiving the request, wireless network 104 sends to mobile device 202 one or more messages which include a response for establishing the new data communication session (step 804 of FIG. 8). One or more of these messages include new or updated QoS parameters for the existing data communication session. One of the new or updated QoS parameters is a new or updated bandwidth parameter which indicates the new or updated maximum bandwidth provided or permitted by wireless network 104 for the existing data communication session. Mobile device 202 receives the one or more messages which include the response and the new or updated QoS parameters.

It is noted that the new or updated bandwidth parameter may indicate a new or updated bandwidth that is less than or the same as (i.e. no greater than) the existing permitted bandwidth for the existing data communication session. If an existing application is being terminated, however, then the new or updated bandwidth may be greater than or the same as the previously allocated bandwidth.

The new data communication session between mobile device 202 and wireless network 104 is then established for data packet communications therebetween (step 806 of FIG. 8). Thereafter, mobile device 202 sends to host server 604 one or more messages which include a request (e.g. a request for service for the application) (step 808 of FIG. 8). Host server 604 receives the request and, in response, a new data connection is established between mobile device 202 and host server 604 for communicating data (step 810 of FIG. 8). The data connection may include a TCP/IP connection and/or other suitable connection(s) for communications.

Further, in response to establishing the new data communication session, or receipt of the new or updated QoS parameters, mobile device 202 sends to host server 602 one or more messages which includes the new or updated bandwidth parameter which was extracted by mobile device 202 from the new or updated QoS parameters sent from wireless network 104 (step 812 of FIG. 8). As an alternative to sending the new or updated bandwidth parameter itself, mobile device 202 may send to host server 602 a value derived from or otherwise indicative of the bandwidth parameter.

Host server 602 then receives the new or updated bandwidth parameter. In response, host server 602 selects or otherwise determines a size of the data packet window for packet data communications with mobile device 202 (step 814 of FIG. 8). Host server 602 may select or determine the size of the data packet window as the function of the bandwidth parameter. The aspects regarding the selection or the determination of the size of the data packet window using the function was described previously in relation to FIG. 7. Assuming that the new or updated bandwidth parameter is (at least somewhat significantly) different from the previous bandwidth parameter (i.e. the bandwidth allocation has changed), the selected or determined size of the data packet window will change.

Host server 602 continues to communicate data to mobile device 202 via wireless router system 610 in data packets, but with use of the new or updated size of the data packet window. In particular, the data packets are communicated from host server 602 within the new or updated size of the data packet window, where they reach wireless router system 610 (step 816 of FIG. 8). Wireless router system 610 performs a queuing function in its memory (step 816 of FIG. 8) prior to transmission of all data packets to mobile device 202 (step 820 of FIG. 8). Mobile device 202 receives the data in the data packets via the data communication session in wireless network 104.

Advantageously, efficiencies in and/or the proper balance between data throughput and network/server queuing in wireless router system 610 (which may merely be a proxy server, for example) may be achieved using techniques of the present disclosure, as care is taken in what data packet window size is utilized to communicate data packets to mobile devices.

In an alternative embodiment, mobile device 202 performs the selection or determination of the size of the window using the function and host server 602 does not. Mobile device 202 sends to host server 602 the selected size as a value derived from the bandwidth parameter. In this case, host server 602 receives an instruction from mobile device 202 to perform the data packet windowing using the selected size as sent from mobile device 202.

Note that the data packet window utilized in the present techniques may be or be referred to as an "in-flight" data packet window. The size of an "in-flight" data packet window specifies the maximum number of data packets that are permitted to be communicated from the sender (e.g. the host server) to the recipient (e.g. communication device) without the receipt of corresponding acknowledgements before the sender is permitted to send any additional data packets to the recipient. Such an in-flight data packet window is particularly suitable in a wireless environment for particular data applications.

As described above, the data packet window may be set to a size that is a function of the indicated bandwidth in the QoS parameters from the packet data session. This size may be a fixed (i.e. unchanging) size that is utilized for all data packet communication from the host server to the mobile device, or at least a size that persists over a (e.g. relatively long) period of time. On the other hand, the size may be an initial size that is utilized for initial data packet communications from the host server to the mobile device, which is then subsequently adjusted based on predetermined criteria, such as a round trip time of data packet communications.

Figure 9:
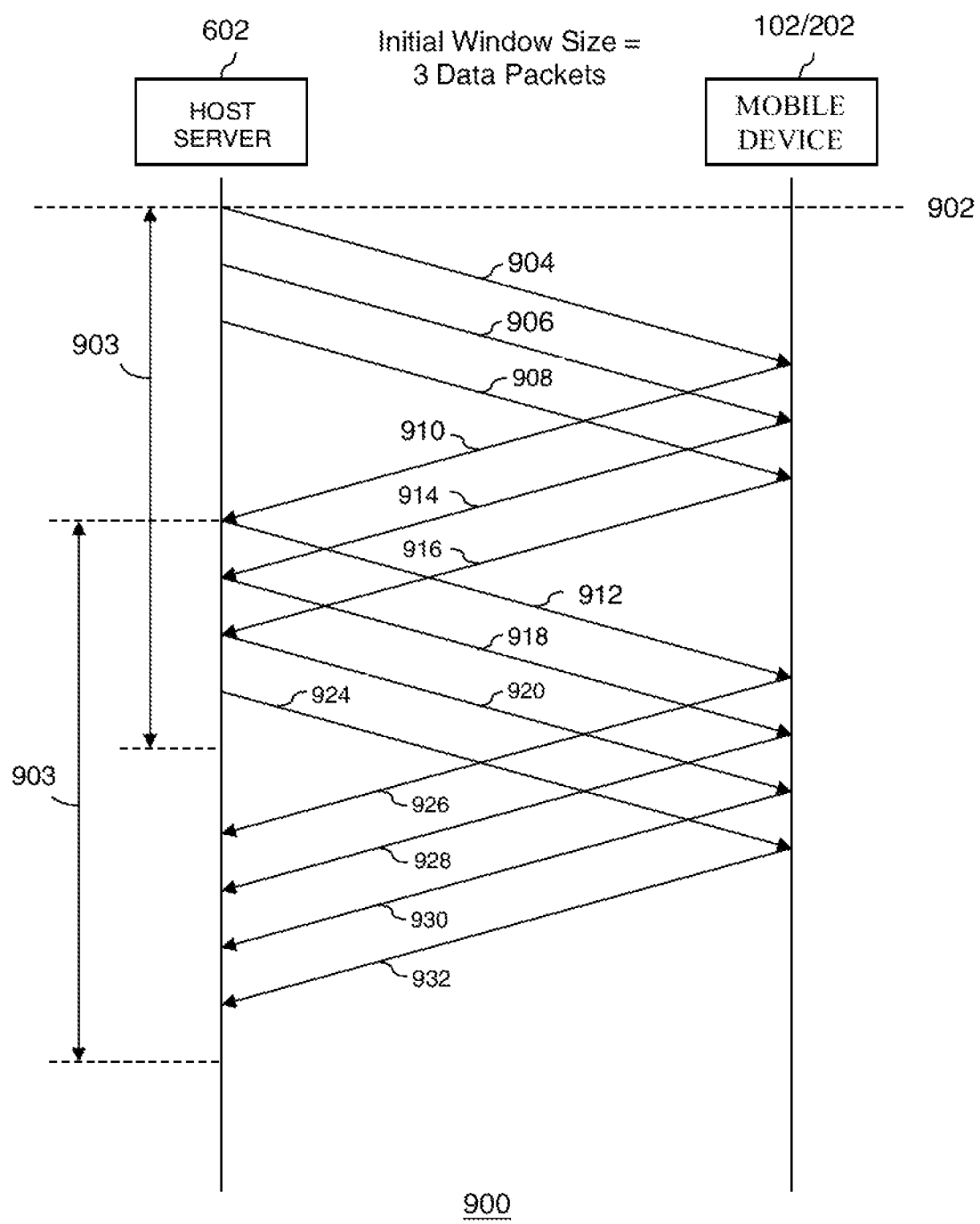
FIGS. 9-10 are communication diagrams which illustrate examples of data packet communications between the host server and the mobile device with use of data packet windowing techniques.
Figure 10:
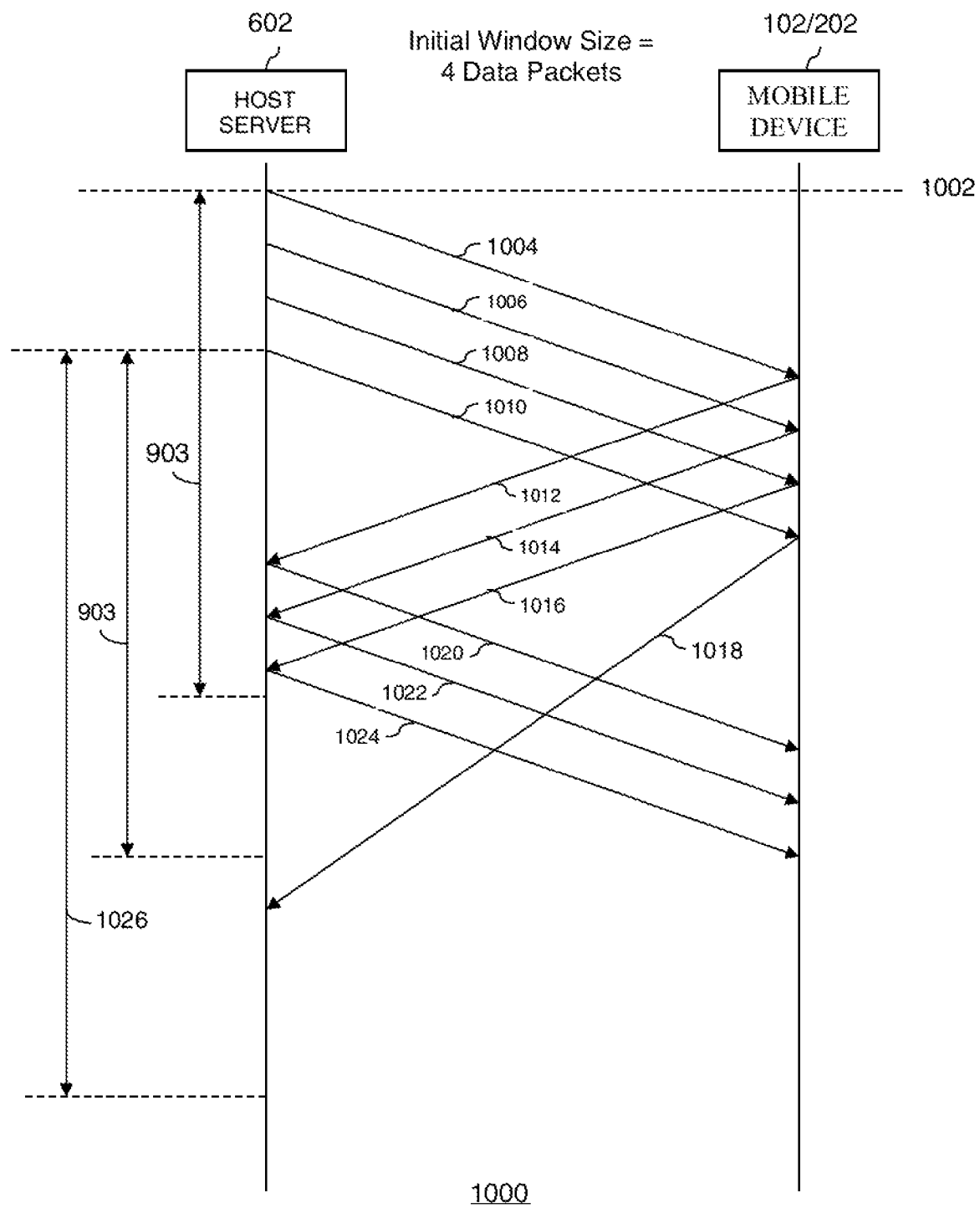

FIGS. 9 and 10 illustrate such concept of subsequently adjusting the window size based on predetermined criteria, such as a round trip time of data packet communications. More particularly, FIG. 9 is a communication diagram 900 where it is shown that the host server 602 sets the initial size of the data packet window to three (3) data packets based on a first predetermined bandwidth. At time 902, host server 602 begins to transmit the first set of data packets 904, 906, and 908, to the mobile device 202. In response, it is shown that mobile device 202 transmits an acknowledgment signal for each data packet received. As soon as host server 602 receives the first acknowledgment signal 910, which corresponds to data packet 904, it transmits next data packet 912, thereby keeping the number of "packets in flight" equal to three.

Although the initial size of the data packet window is set to three (3), FIG. 9 also reveals an adjustment (e.g. increase) in the window size for the data packet transmissions. The adjustment may be made based on a round trip time of data packet communications, or any other suitable criteria. In this example, the window size increment is set to a single data packet. Host server 602 receives acknowledgment signals 914 and 916 corresponding to data packets 906 and 908, and transmits data packets 918 and 920. Because the round trip time for each of the first set of data packets 904, 906, and 908 is less than a first time threshold 903, the window size for the packets in flight is increased to four (4) data packets, and host server 602 transmits data packet 924 after data packet 920. Host server 602 then receives corresponding acknowledgment signals 926, 928, 930, and 932 within the first time threshold 903. Although not shown in FIG. 9, because the round trip time for each of the four data packets is again less than the first time threshold 903, the window size would be increased to five (5) data packets if more data packets were available. Host server 602 would have transmitted four data packets in response to receiving each of the acknowledgment signals 926, 928, 930, and 932, and in addition, would have transmitted another data packet.

FIG. 10 is another communication diagram 1000 where it is shown that the host server 602 sets the initial size of the data packet window to four (4), data packets based on a second predetermined bandwidth that is greater than the first predetermined bandwidth. In this example, all the conditions are the same as the example in FIG. 9. Host server 602 has the window size initially set to four (4) data packets. At time 1002, host server 602 begins to transmit the four data packets 1004, 1006, 1008, and 1010, to mobile device 202. Mobile device 202 then transmits corresponding acknowledgment signal 1012, 1014, 1016, and 1018. As described previously, host server 602 transmits data packet 1020, 1022, and 1024 in response to receiving the acknowledgment signal 1012, 1014, and 1016 within the first time threshold.

Although the initial size of the data packet window is set to four, FIG. 10 reveals a decrease in the window size for the data packet transmissions. The adjustment may be made based on a round trip time of data packet communications, or any other suitable criteria. Because the round trip time for data packet 1010 is greater than the first time threshold 903, the window size is decreased to three (3) data packets. A second time threshold is also shown in FIG. 9 as measured against data packet 1010 and the corresponding acknowledgment signal 1018. Data packets having round trip times longer than the time threshold may be considered to be lost and thus re-transmitted. Instead of actually measuring the time period longer than the second time threshold, host server 602 may consider a data packet to be lost if it fails to receive an acknowledgement signal corresponding to the data packet within the second time threshold.

As apparent, efficiencies in (and/or the proper balance between) data throughput and network/server queuing in the wireless router system (which may merely be a proxy server, for example) may be achieved using techniques of the present disclosure, as care is taken in what data packet window size is utilized to communicate data packets to mobile devices.

Thus, methods and apparatus for use in communicating data packets have been described. A communication device of the present disclosure receives one or more Quality of Service (QoS) parameters of a data communication session established between it and a wireless communication network. The one or more QoS parameters may be or include a bandwidth parameter. The communication device sends the bandwidth parameter or a value derived therefrom to a host system via the wireless communication network. The communication device then receives, from the host system via the wireless communication network, data packets via the data communication session. The data packets are communicated within a data packet window having a size that is set as a function of the bandwidth parameter. If another data communication session is established, the communication device sends an updated bandwidth parameter to the host system for receiving data packets within a data packet window having an updated size that is set in accordance with the function.

Correspondingly, a host system which may be or include a host server receives a bandwidth parameter or a value derived therefrom from a mobile communication device operative in a wireless communication network. The bandwidth parameter is identified from one or more Quality of Service (QoS) parameters of a data communication session established between the mobile communication device and the wireless communication network. The host system selects a size of a data packet window as a function of the bandwidth parameter or the value derived therefrom. The host system then communicates, to the mobile communication device via the wireless communication network, data packets within a data packet window having the selected size. If another data communication session is established, the host system receives an updated bandwidth parameter from the mobile communication device for determining or selecting an updated size that is set in accordance with the function for communicating data packets within a data packet window having the updated size.

The above-described embodiments of the present disclosure are intended to be examples only. Similar or the same problems may exist in different environments (e.g. in a CDMA environment, a tunnel refers to a Point-to-Point. Protocol "PPP" session; in an WLAN environment, a tunnel is referred to as a network connection; and in virtual private network "VPN" environments, a tunnel refers to a VPN tunnel). Although it is described in such techniques that the mobile device communicates with a single host server, the host server may be or be part of a host system, which may be a distributed system having multiple points with which the mobile device communicates.

Those of skill in the art may effect alterations, modifications and variations to the particular embodiments without departing from the scope of the application. The invention described herein in the recited claims intends to cover and embrace all suitable changes in technology.

What is claimed is:

1. A method in a mobile communication device configured to operate in a wireless communication network, the method comprising:
    sending, from the mobile communication device to the wireless communication network, one or more messages indicating a request for establishing a data communication session with the wireless communication network;
    in response to the request, receiving, at the mobile communication device from the wireless communication network, one or more messages which includes a response for establishing the data communication session with the wireless communication network, the one or more messages including one or more Quality of Service (QoS) parameters of the data communication session, the one or more QoS parameters comprising a bandwidth parameter;
    sending, from the mobile communication device, the bandwidth parameter or a value derived therefrom to a host server via the wireless communication network;
    receiving, at the mobile communication device, from the host server via the wireless communication network, data packets via the data communication session, the data packets being communicated within a data packet window having a size that is set as a function of the bandwidth parameter;
    after establishing an additional data communication session with the wireless communication network, sending, from the mobile communication device, an updated bandwidth parameter or a value derived therefrom to the host server via the wireless communication network; and
    receiving, at the mobile communication device, from the host server via the wireless communication network, data packets which are communicated within a data packet window having an updated size that is set as a function of the updated bandwidth parameter.

2. The method of claim 1, wherein the host server is configured to provide an electronic mail (e-mail) or Internet Web browsing service for the mobile communication device.

3. The method of claim 1, wherein the size of the data packet window is an initial size, and wherein the size is subsequently adjusted based on a round trip time of the data packets being communicated.

4. The method of claim 1, wherein the data session comprises a packet data protocol (PDP) context.

5. The method of claim 1, wherein the size of the data packet window specifies the maximum number of data packets that are permitted to be communicated from the host server without receipt of corresponding acknowledgements before the host server is permitted to communicate any additional data packets to the mobile communication device.

6. The method of claim 1, further comprising the act of:
    setting, by the mobile communication device, the size of the data packet window as a function of the bandwidth parameter, and sending it to the host server via the wireless communication network as the value derived from the bandwidth parameter.

7. The method of claim 1, wherein establishing the additional data communication session further comprises:
    sending, from the mobile communication device to the wireless communication network, one or more messages indicating a request for establishing the additional data communication session with the wireless communication network; and
    in response to the request, receiving, at the mobile communication device from the wireless communication network, one or more messages which includes a response for establishing the additional data communication session with the wireless communication network, the one or more messages including one or more updated QoS parameters in response to establishing the second data communication session, the one or more updated QoS parameters comprising the updated bandwidth parameter.

8. The method of claim 1, which is embodied as computer instructions stored in a non-transitory computer readable medium for execution by one or more processors of the communication device.

9. A mobile communication device, comprising:
    a controller;
    a radio frequency (RF) transceiver coupled to the controller and operative for communications with a wireless network;
    the controller being configured to:
        send, to the wireless network via the RF transceiver, one or more messages indicating a request for establishing a data communication session with the wireless network;
        in response to the request, receive, from the wireless network via the RF transceiver, one or more messages which includes a response for establishing the data communication session with the wireless network, the one or more messages including one or more Quality of Service (QoS) parameters of the data communication session, the one or more QoS parameters comprising a bandwidth parameter;
        send, to a host server via the RF transceiver, the bandwidth parameter or a value derived therefrom;
        receive, from the host server via the RF transceiver, data packets via the data communication session, the data packets which are communicated in a data packet window having a size that is set as a function of the bandwidth parameter;
        after establishing an additional data communication session with the wireless communication network, send, to the host server via the RF transceiver, an updated bandwidth parameter or a value derived therefrom; and
        receive, from the host server via the RF transceiver, data packets which are communicated within a data packet window having an updated size that is set as a function of the updated bandwidth parameter.

10. The mobile communication device of claim 9, wherein the host server is configured to provide an electronic mail (e-mail) or Internet Web browsing service for the mobile communication device.

11. The mobile communication device of claim 9, wherein the controller is further operative to set the size of the data packet window as a function of the bandwidth parameter, and send it to the host server via the wireless network as the value derived from the bandwidth parameter.

12. The mobile communication device of claim 9, wherein the size of the data packet window is an initial size, and the controller is further configured to:
    receive, via the RF transceiver, from the host server via the wireless network, additional data packets in the data communication session, the data packets being communicated within a data packet window having an updated size that is adjusted based on a round trip time of the data packets being communicated.

13. The mobile communication device of claim 9, wherein the data session comprises a packet data protocol (PDP) context.

14. The mobile communication device of claim 9, wherein the host system sets the size of the data packet window as the function of the bandwidth parameter.

15. The mobile communication device of claim 9, wherein the controller is configured to establish the additional data communication session by being further configured to:
    send, to the wireless network via the RF transceiver, one or more messages indicating a request for establishing the additional data communication session with the wireless network;
    in response to the request, receive, from the wireless network via the RF transceiver, one or more messages which includes a response for establishing the additional data communication session with the wireless network, the one or more messages including one or more updated QoS parameters in response to establishing the second data communication session, the one or more updated QoS parameters comprising the updated bandwidth parameter.

16. A method in a host server for use in communicating data to a mobile communication device operating in a wireless communication network, the method comprising:
    receiving, from the mobile communication device, a bandwidth parameter or a value derived therefrom, the bandwidth parameter being included in one or more Quality of Service (QoS) parameters received by the mobile communication device in response to a data communication session being established by the mobile communication device with the wireless communication network;
    selecting a size of a data packet window as a function of the bandwidth parameter or the value derived therefrom;
    communicating, to the mobile communication device via the wireless communication network, data packets within the data packet window having the selected size;
    receiving, from the mobile communication device, an updated bandwidth parameter or a value derived therefrom, the updated bandwidth parameter being included in one or more updated Quality of Service (QoS) parameters received by the mobile communication device in response to an additional data communication session being established by the mobile communication device with the wireless communication network;
    selecting an updated size of the data packet window as a function of the updated bandwidth parameter or the value derived therefrom; and communicating, to the mobile communication device via the wireless communication network, data packets within the data packet window having the selected updated size.

17. The method of claim 16, wherein the function comprises a positive step function.

18. The method of claim 16, wherein the selected size of the data packet window is an initial size, and the method further comprises:
adjusting the size of the data packet window based on a round trip time of the data packets being communicated.

19. The method of claim 16, wherein the data session comprises a packet data protocol (PDP) context.

20. The method of claim 16, wherein sending the data packets to the mobile communication device is performed via a relay network which queues the data packets prior to sending data packets to the mobile communication device via the wireless communication network.

21. The method of claim 16, further comprising:
receiving the bandwidth parameter which is indicative of the maximum bandwidth provided via the wireless communication network.

22. The method of claim 16, wherein the size of the data packet window specifies the maximum number of data packets that are permitted to be communicated from the host system without receipt of corresponding acknowledgements before the host system is permitted to communicate any additional data packets to the communication device.

23. The method of claim 16, which is embodied as computer instructions stored in a non-transitory computer readable medium for execution by one or more processors of the host system.

24. A method in a communication device, the method comprising:
receiving one or more Quality of Service (QoS) parameters of a first data communication session established between the communication device and a wireless communication network, the one or more QoS parameters comprising a bandwidth parameter;
sending the bandwidth parameter or a value derived therefrom to a host system via the wireless communication network; and
receiving, from the host system via the wireless communication network, data packets via the data communication session, the data packets being communicated within a data packet window having a size that is set as a function of the bandwidth parameter;
establishing a second data communication session in the wireless communication network;
receiving one or more updated QoS parameters of the first data communication session in response to establishing the second data communication session, the one or more updated QoS parameters comprising an updated bandwidth parameter;
sending the updated bandwidth parameter or a value derived therefrom to the host system via the wireless communication network; and
receiving, from the host system via the wireless communication network, data packets in the data communication session, the data packets being communicated within a data packet window having an updated size that is set as a function of the updated bandwidth parameter.

25. The method of claim 24, wherein the function comprises a positive step function.

26. The method of claim 24, wherein the size of the data packet window is an initial size, and wherein the size is subsequently adjusted based on a round trip time of the data packets being communicated.

27. The method of claim 24, wherein the data session comprises a packet data protocol (PDP) context.

28. The method of claim 24, wherein the size of the data packet window specifies the maximum number of data packets that are permitted to be communicated from the host system without receipt of corresponding acknowledgements before the host system is permitted to communicate any additional data packets to the communication device.

29. A mobile communication device, comprising:
one or more processors;
a wireless transceiver coupled to the one or more processors and operative for communications with a wireless communication network;
the one or more processors being configured to:
receive via the wireless transceiver one or more Quality of Service (QoS) parameters of a first data communication session established between the mobile communication device and a wireless communication network, the one or more QoS parameters comprising a bandwidth parameter;
send, to the host system via the wireless transceiver, the bandwidth parameter or a value derived therefrom;
receive, from the host system via the wireless transceiver, data packets via the data communication session, the data packets being communicated within a data packet window having a size that is set as a function of the bandwidth parameter;
establish a second data communication session in the wireless communication network;
receive, from the wireless communication network via the wireless transceiver, one or more updated QoS parameters of the first data communication session in response to establishing the second data communication session, the one or more updated QoS parameters comprising an updated bandwidth parameter;
send, to the host system via the wireless transceiver, the updated bandwidth parameter or a value derived therefrom; and
receive, via the wireless transceiver from the host system, data packets in the data communication session, the data packets being communicated within a data packet window having an updated size that is set as a function of the updated bandwidth parameter.

30. The mobile communication device of claim 29, wherein the function is a positive step function.

31. The mobile communication device of claim 29, wherein the one or more processors are further operative to set the size of the data packet window as a function of the bandwidth parameter, and send the size of the data packet window to the host system via the wireless communication network as the value derived from the bandwidth parameter.

32. The mobile communication device of claim 29, wherein the size of the data packet window is an initial size, and the one or more processors are further configured to:
receive, from the host system via the wireless communication network, additional data packets in the data communication session, the data packets being communicated within a data packet window having an updated size that is adjusted based on a round trip time of the data packets being communicated.

33. The mobile communication device of claim 29, wherein the data session comprises a packet data protocol (PDP) context.

* * * * *